US005852960A

United States Patent [19]

Wu

[11] Patent Number: 5,852,960

[45] Date of Patent: Dec. 29, 1998

[54] WRENCH HAVING A ROTATABLE HANDGRIP

[76] Inventor: Arthur Wu, No. 41-12, Lane 548, Chong San Road, Shern Gan Hsiang, Taichung Hsien, Taiwan

[21] Appl. No.: 840,567

[22] Filed: Apr. 21, 1997

[51] Int. Cl.$^{6}$ .................................................... B23B 13/16

[52] U.S. Cl. .......................................... 81/177.5; 81/177.1

[58] Field of Search ................................ 81/177.1, 177.2, 81/489, 177.5

[56] References Cited

U.S. PATENT DOCUMENTS

| | | | |
|---|---|---|---|
| 1,642,569 | 9/1927 | Winslow et al. | 81/177.1 X |
| 2,712,765 | 7/1955 | Knight | 81/177.1 X |
| 3,318,176 | 5/1967 | Geier | 81/177.1 X |

*Primary Examiner*—James G. Smith

[57] ABSTRACT

A wrench includes a handle having a driving head secured on one end and having a handgrip rotatably engaged on the other end for engaging with the hand of the user and for allowing the handgrip to be rotated relative to the handle and for allowing the wrench to be easily rotated and driven by the user. The wrench may include two handgrips rotatably engaged on the end portion of the handle and may include an end cap for retaining the handgrip in place.

2 Claims, 7 Drawing Sheets

WRENCH HAVING A ROTATABLE HANDGRIP

BACKGROUND OF THE INVENTION

1. Field of the Invention

The present invention relates to a wrench, and more particularly to a wrench having a rotatable handgrip.

2. Description of the Prior Art

Typical wrenches comprise a handle and a driving head formed on one end of the handle for engaging with and for driving fasteners. However, as shown in FIGS. 10–15, the hand of the user should tightly grasp the handle of the wrench for rotating the wrench. However, due to different rotational angles and different driving radiuses, the driving head of the wrench may be tilted or inclined relative to the fastener such that only two engaging points are formed between the driving head and the fastener and such that both the fastener and the driving head will be easily damaged.

The present invention has arisen to mitigate and/or obviate the afore-described disadvantages of the conventional wrenches.

SUMMARY OF THE INVENTION

The primary objective of the present invention is to provide a wrench having a rotatable handgrip for allowing the user to easily and smoothly drive the wrench.

In accordance with one aspect of the invention, there is provided a wrench comprising a handle including a first end having a driving head and including a second end, and at least one handgrip rotatably engaged on the second end of the handle for engaging with user's hand and for allowing the handgrip to be rotated relative to the handle.

The second end of the handle includes a pair of notches, the wrench includes a pair of shafts secured in the notches of the handle, and includes a pair of handgrips rotatably engaged on the shafts.

An end cap is secured to the second end of the handle for retaining the handgrip in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
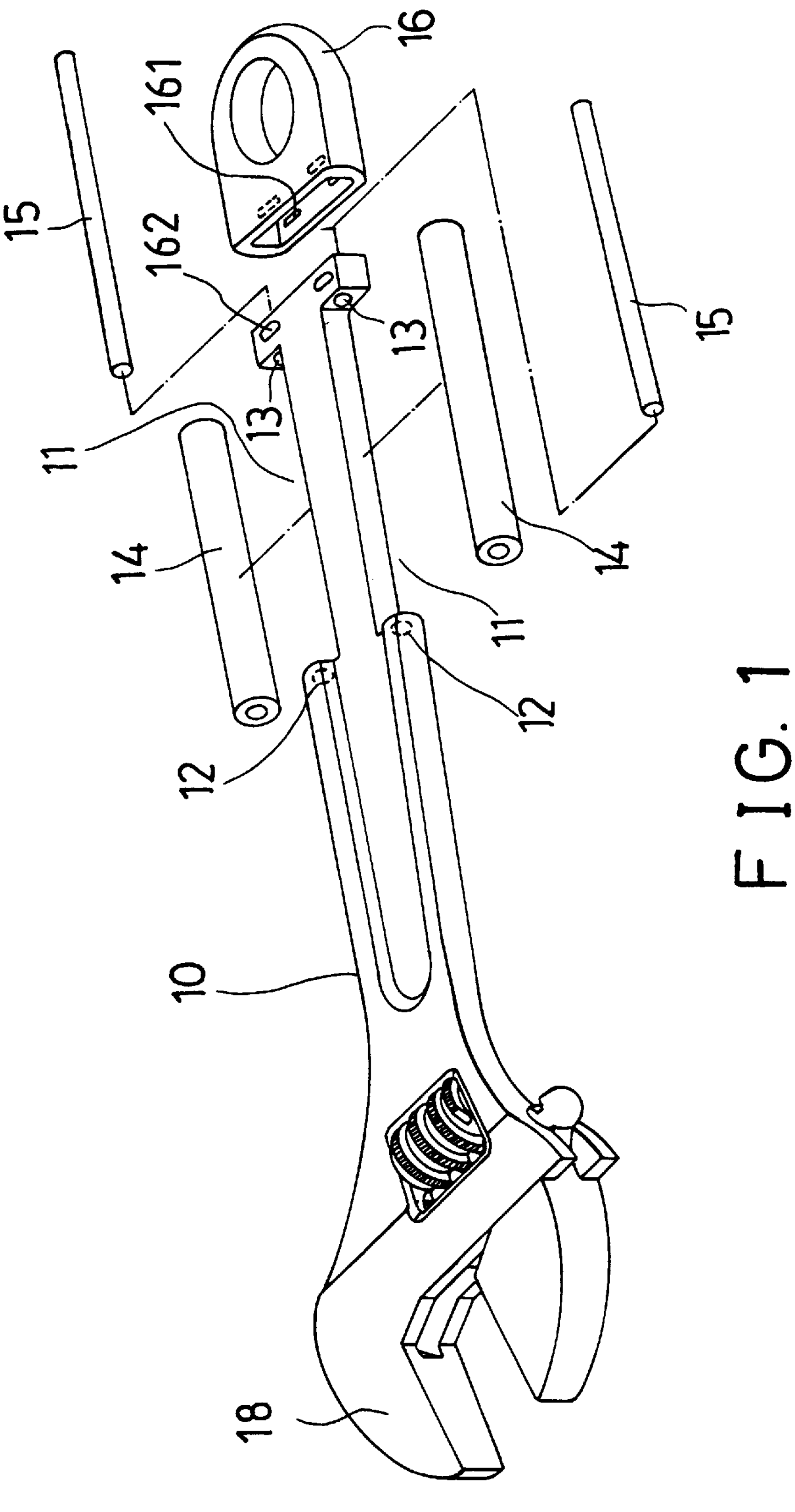
FIG. 1 is an exploded view of a wrench in accordance with the present invention.
Figure 2:
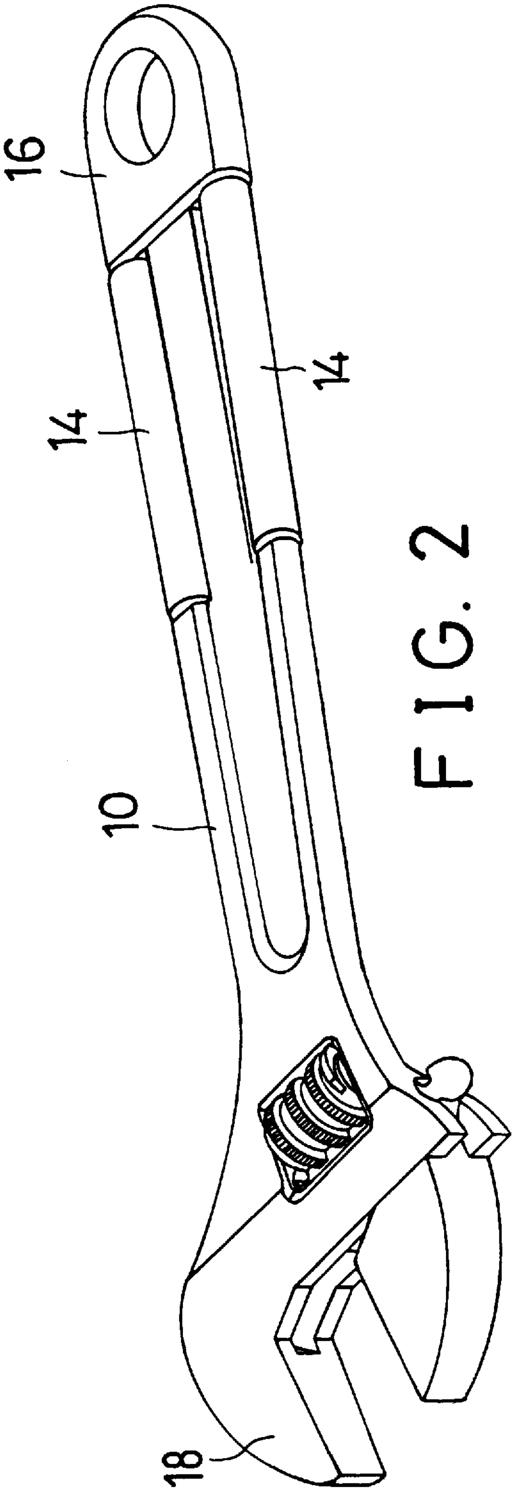
FIG. 2 is a perspective view of the wrench.
Figure 3:
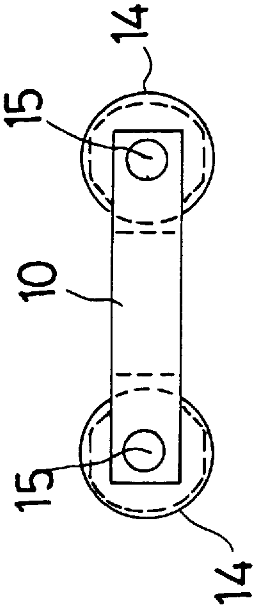
FIG. 3 is an end view of the wrench before the end cap is secured to the wrench.

Referring to the drawings, and initially to FIGS. 1–3, a wrench in accordance with the present invention comprises a handle 10 and a driving head 18 provided on one end of the handle 10 for engaging with and for driving fastener and the like. The handle 10 includes a pair of notches 11 formed in the other end distal to the driving head 18, for rotatably engaging with a pair of handgrips 14 by shafts 15 which include two ends engaged in the holes 12, 13 of the handle 10. An end cap 16 is secured to the end portion of the handle 10 by projections and depressions 161, 162, for enclosing and for retaining the end portions of the shafts 15 in place.

In operation, the hand of the user may grasp the handgrips 14 which are rotatable about the shafts 15 such that the hand of the user may be rotated relative to the handle 10 and may smoothly drive and rotate the handle 10. The driving head 18 thus will not be tilted relative to the fastener such that the working life of the fastener and the driving head may be greatly increased.

Figure 4:
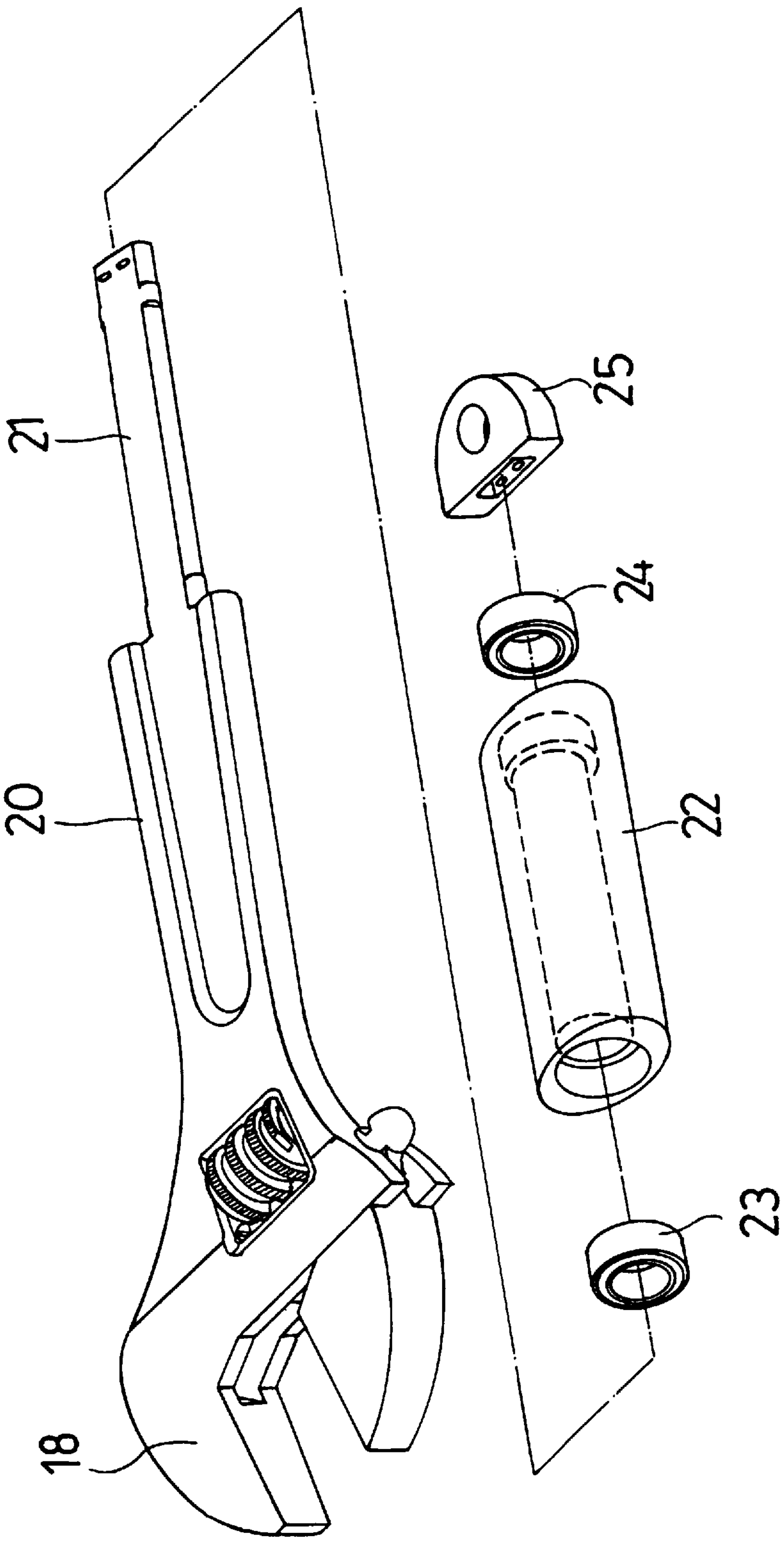
FIG. 4 is an exploded view illustrating another application of the wrench.
Figure 5:
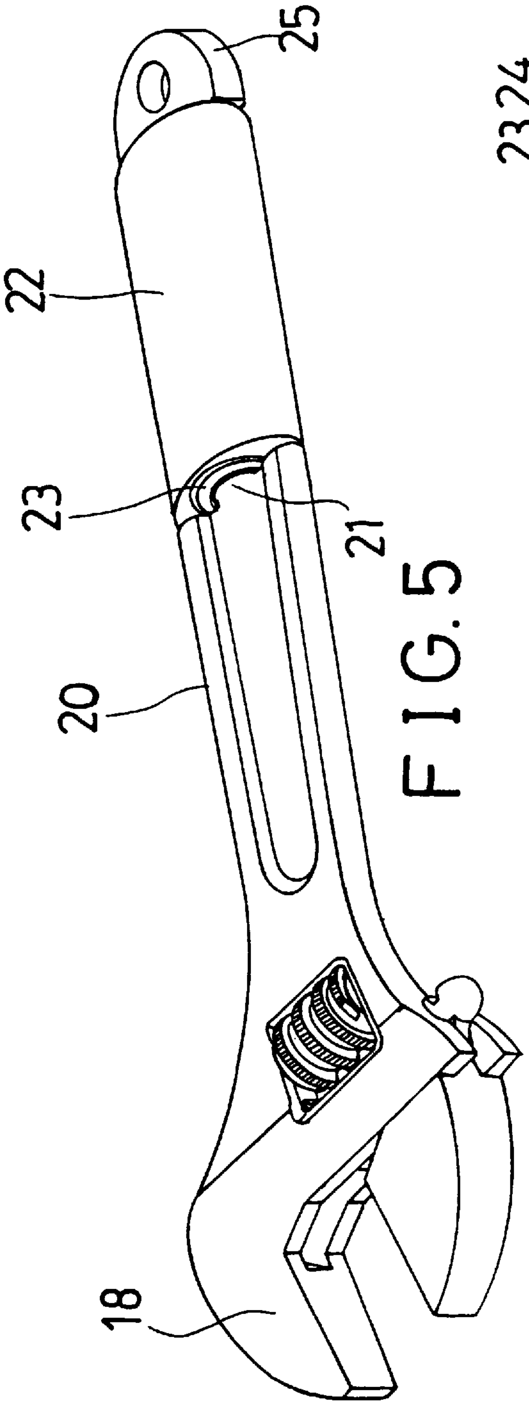
FIG. 5 is a perspective view of the wrench as shown in FIG. 4.
Figure 6:
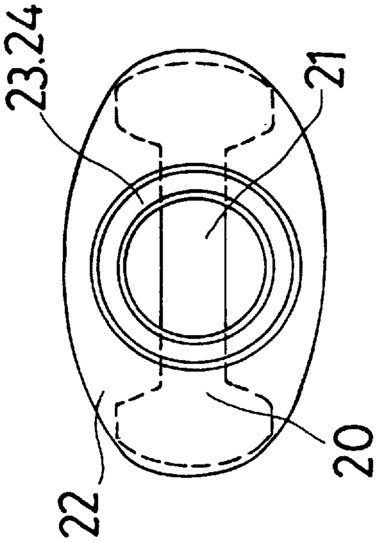
FIG. 6 is an end view of the wrench as shown in FIG. 5 before the end cap is secured to the wrench.

Referring next to FIGS. 4–6, the handle 20 may include a single shaft 21 extended rearward for rotatably engaging with the single handgrip 22 by bearings 23, 24. The end cap 25 may be secured to the shaft 21 for retaining the handgrip 22 in place. In operation, the handgrip 22 may also be rotated relative to the handle 20 for allowing the user to easily and smoothly drive and rotate the handle 20.

Figure 7:
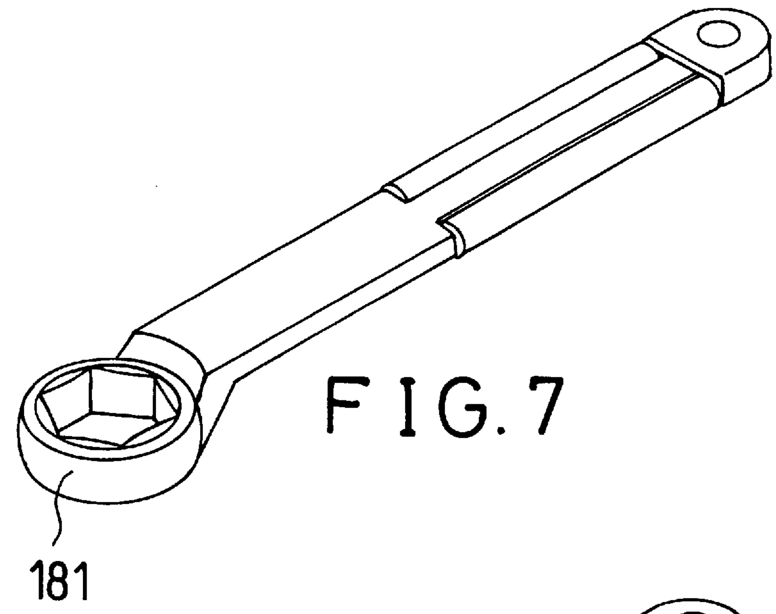
FIGS. 7, 8, 9 are perspective views illustrating the applications of the wrench.
Figure 8:
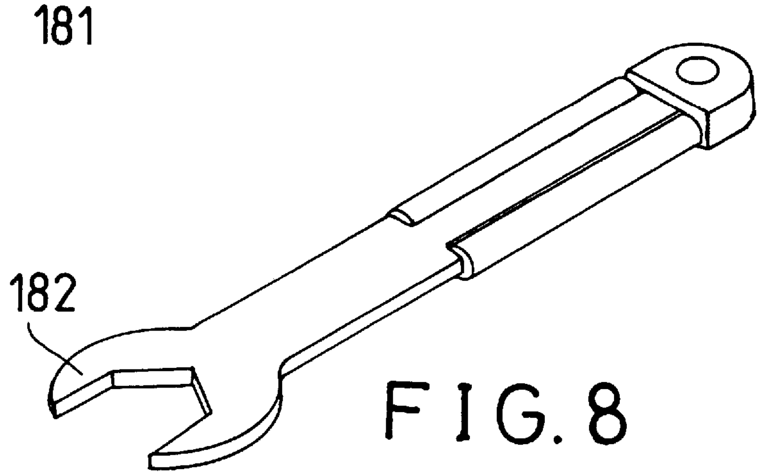
Figure 9:
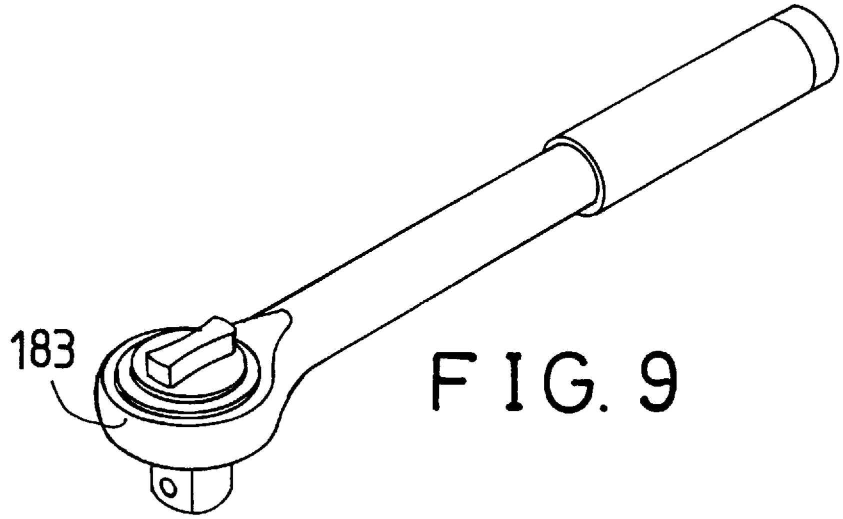
Figure 10:
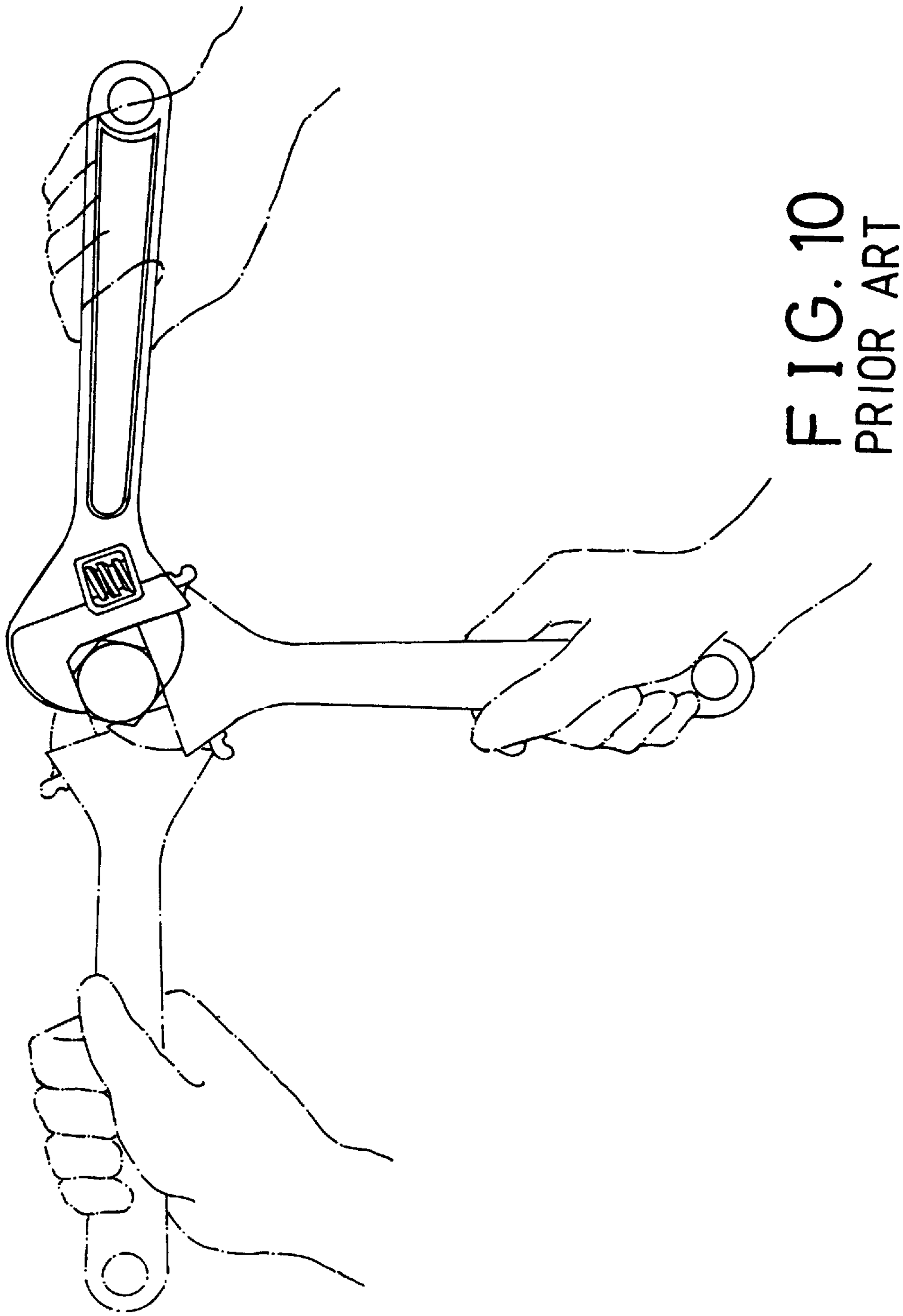
FIG. 10 PRIOR ART
FIGS. 10, 11, 12, 13, 14, 15 are schematic views illustrating the operation of the typical wrench.
Figure 11:
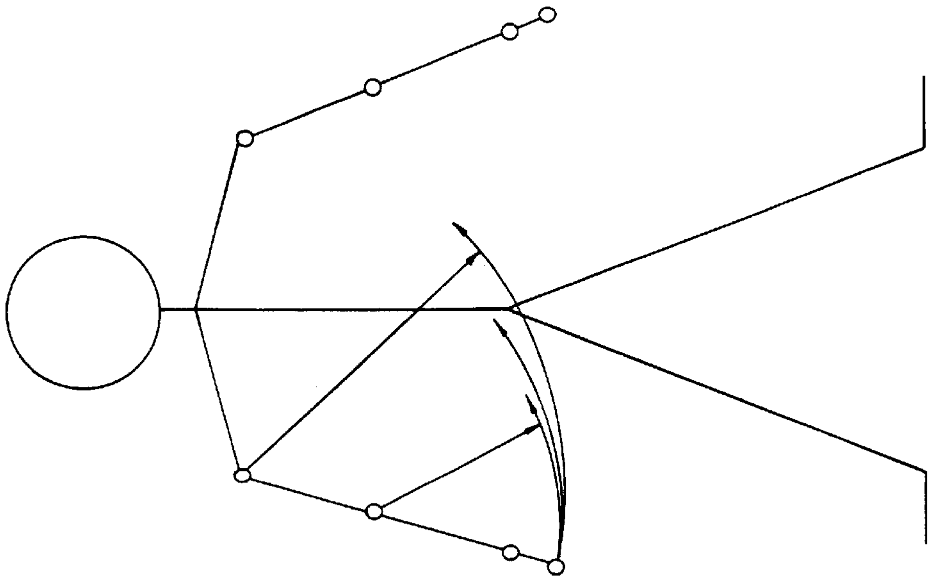
FIG.11 PRIOR ART
Figure 12:
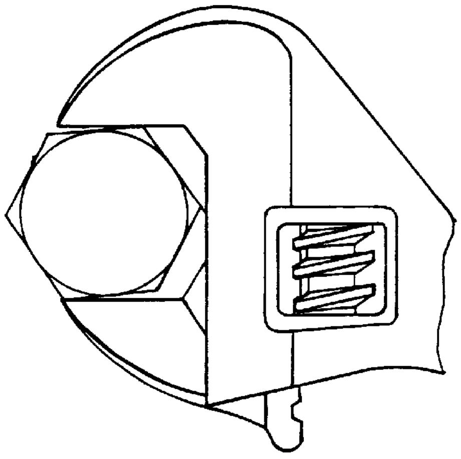
FIG.12 PRIOR ART
Figure 13:
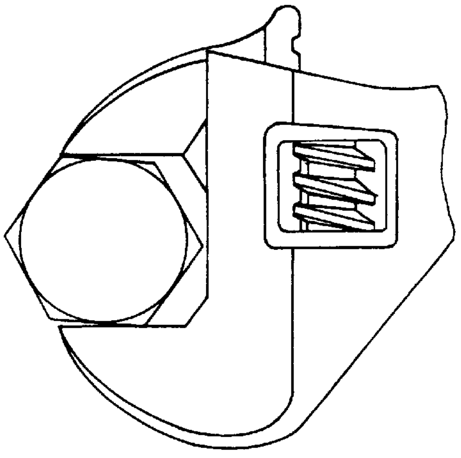
FIG.13 PRIOR ART
Figure 14:
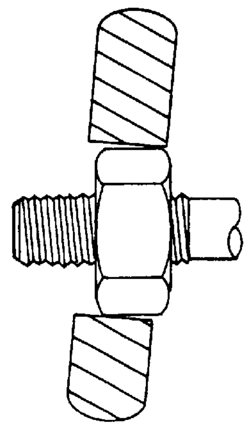
FIG.14 PRIOR ART
Figure 15:
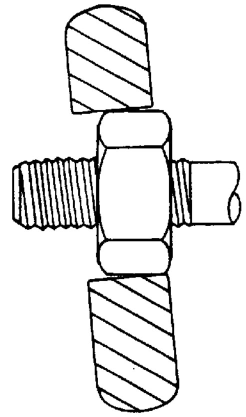
FIG.15 PRIOR ART

Referring next to FIGS. 7–9, the driving head may include a closed type driving head 181 (FIG. 7), an open head 182 (FIG. 8), or a driving head 183 for engaging with an extension.

Accordingly, the wrench in accordance with the present invention includes a rotatable handgrip for allowing the user to easily and smoothly drive the wrench.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wrench comprising:

a handle including a first end having a driving head and including a second end, said second end of said handle including a pair of notches, a pair of shafts secured in said notches of said handle, and a pair of handgrips rotatably engaged on said shafts for engaging with user's hands and for allowing said handgrips to be rotated relative to said handle.

2. The wrench according to claim 1 further comprising an end cap secured to said second end of said handle for retaining said handgrips in place.

* * * * *